March 20, 1928.
R. PHILIPP
1,662,936
CHAMFERING DEVICE
Filed April 7, 1926
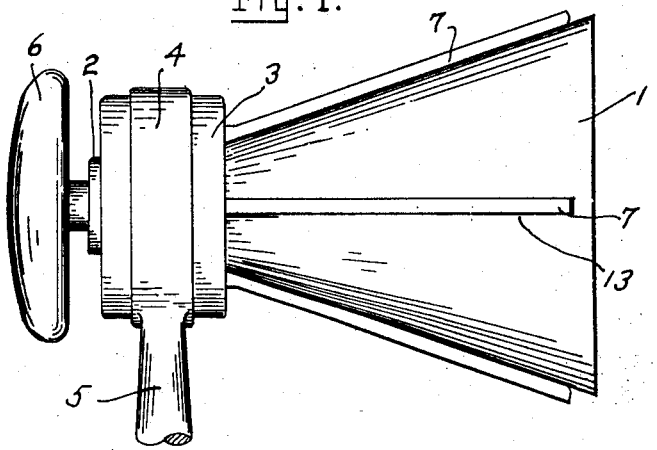
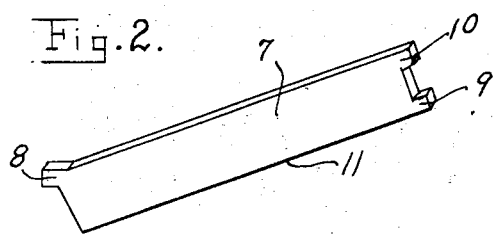
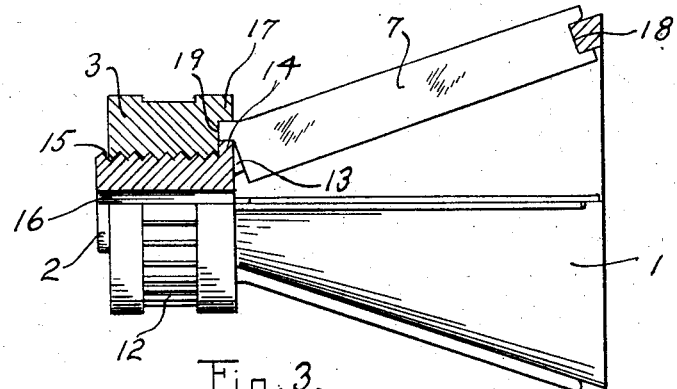
Inventor
Robert Philipp Patented Mar. 20, 1928.

1,662,936

UNITED STATES PATENT OFFICE.

ROBERT PHILIPP, OF WASHINGTON, DISTRICT OF COLUMBIA.

CHAMFERING DEVICE.

Application filed April 7, 1926. Serial No. 100,289.

This invention relates to means for removing the bur and chamfering the end of a pipe or rod. When a pipe is cut, the cutting tool causes a roughness on the end of the pipe. Various reamers have been devised to remove the bur from the inside of the pipe. This invention is devised to remove the bur and chamfer the outside of the pipe.

A further object of the invention is to provide a structure in which the knives or cutting blades are easily removed for sharpening and are rigidly supported.

A further object is to provide means for removing the bur from various sizes of pipes.

A further object is to provide such a tool which is rugged in construction, easy to assemble and which can be manufactured without the employment of special machinery.

Other objects will be apparent from the following disclosure.

In the accompanying drawing, Figure 1 is a side view of my improved chamfering device; Figure 2 is a perspective view of the cutting blade used in the device; Figure 3 is a view similar to that of Figure 1, but with the ratchet means and pommel removed, the upper half being in cross-section to show cooperation of the elements.

Referring to the drawing, 1 indicates a hollow conically shaped member which has an integral threaded stud 2 extending from its smaller end. A threaded nut 3 is provided to cooperate with the stud 2, said nut being provided with ratchet teeth 12 on its periphery adapted to be actuated by a suitable ratchet means 4 provided with a handle 5. The ratchet means is so designed as to cause, when viewed from the left of Fig. 3, a right hand or clockwise motion to be imparted to the nut 3.

The stud 2 is provided with a suitable boring 16 to which may be riveted, peaned or otherwise suitably secured, a pommel or brace 6. The design is such that the stud 2 and cone-shaped member 1 swivel upon the axle of the pommel.

The conically shaped member 1 is provided with a plurality (shown as four) of slots 13 into which the blades 7 are secured by the projections 9 and 10 of the blade cooperating with the end 18 of said slot and the projection 8 cooperating with portion 14 of the stud 2 and the side 19 and flange 17 of the nut 3. The projection 10 is slightly curved as shown to aid in assembly.

Thus, suitable cutting surfaces 11, which may or may not be beveled, are provided on the inside of the cone-shaped member 1.

In assembling, the blades 7 are placed in the slots the nut 3 carrying the ratchet means applied to the stud 2 and the pommel secured to the stud.

When the blades become dull and it is desired to sharpen them the nut 3 is turned to the left (viewed from the left of Figure 2) a sufficient amount that the flange 17 moves off from the projection 8. The nut may have suitable means, as holes in the wall, for aiding in turning.

It is to be noted that, once assembled, the parts cannot be easily separated (excepting the blades) and the essential parts cannot easily be lost.

It is also pointed out that no set screws or delicate apparatus are necessary and that the device is rugged and compact.

The above description is to be considered as merely illustrative of the invention since it is obvious that minor changes in construction might be made without departing from the spirit and scope of the following claims.

I claim:

1. A chamfering tool for pipes or the like consisting of a hollow cone-shaped supporting member having a plurality of longitudinal slots therein and a threaded stud extending from the smaller end thereof, a plurality of blades, one mounted in each of said slots, said blades providing a plurality of cutting edges adjacent the interior surface of said supporting member, and a nut engaging and cooperating with said stud to removably secure said blades in the slots and to impart rotary motion to said supporting member and blades.

2. In a tool for removing the bur from the outside of various sizes of pipe, a hollow conical supporting member having a plurality of longitudinal slots therein, a plurality of blades, one mounted in each of said slots to provide a plurality of cutting edges adjacent the interior surface of said supporting member, a nut mounted on said supporting member adjacent the smaller end thereof for removably securing said blades in position and for imparting rotary motion to said member and blades.

3. In a chamfering tool for pipes and the like, the combination of a hollow cone-shaped supporting member having a plurality of longitudinal slots therein and a stud extending from the smaller end thereof, a plurality of blades, one mounted in each of said slots so as to provide cutting edges adjacent the inner surface of said supporting member, each of said blades having two projections on the upper end, adapted, when mounted in said slots to engage the inner and outer upper surface of the supporting member, each of said blades also having a single projection on the lower end adapted to rest upon the outer lower surface of said supporting member and a nut cooperating with said stud to impart rotary motion to the supporting member and blades, said nut having a flange adapted to engage said single projections on the blades to removably secure said blades to said supporting member.

ROBERT PHILIPP.